United States Patent [19]

Toor et al.

[11] 4,161,035

[45] Jul. 10, 1979

[54] CIRCUITRY FOR DISPLAYING A CONSTANTLY CHANGING M-MODE OUTPUT ON A RASTER SCAN DISPLAY

[75] Inventors: Yair Toor, Rehovot; Haim Rouso, Tel-Aviv; Ben-Zion Kopilavitz, Petach Tikva, all of Israel

[73] Assignee: Israel Electro-Optical Industry Ltd., Rehovot, Israel

[21] Appl. No.: 847,021

[22] Filed: Oct. 31, 1977

[51] Int. Cl.[2] .................... G06F 3/14

[52] U.S. Cl. .................... 364/900; 340/724; 340/799

[58] Field of Search ... 364/900 MS File, 200 MS File; 340/324 AD; 128/2.06 R, 2.06 G, 2.06 V

[56] References Cited

U.S. PATENT DOCUMENTS

| | | | |
|---|---|---|---|
| 3,835,455 | 9/1974 | Abbenante | 364/900 |
| 3,883,852 | 5/1975 | Cotter | 364/900 |
| 3,898,644 | 8/1975 | Baxter | 340/324 AD |
| 3,909,792 | 9/1975 | Harris et al. | 364/900 |
| 3,947,826 | 3/1976 | Bockwoldt | 364/900 X |
| 4,045,815 | 8/1977 | Griffith et al. | 340/324 AD X |
| 4,070,662 | 1/1978 | Narveson | 340/324 AD |

*Primary Examiner*—Melvin B. Chapnick
*Attorney, Agent, or Firm*—Browdy and Neimark

[57] ABSTRACT

Circuitry for displaying a constantly changing M-mode transducer scan output on a raster scan display in the form of a first multiplicity of data lines each containing a second multiplicity of data words and each representing a scan of the transducer output at a particular closely spaced scanning time and such that the data line representing the oldest scan is periodically erased and a data line representing the newest scan is displayed. The circuitry includes random access memory having a first multiplicity of memory elements each for storing a data line. A random access memory input counter enables loading of the memory, data line by data line, and a random access memory advance output counter enables read out from the memory sequentially one data word from each line for each raster scan.

2 Claims, 4 Drawing Figures

HORIZONTAL
74121
130
132
7476/2
CLEAR
VERTICAL SYNC.
HORIZONTAL LINE COUNTER
144
146
74193
7476/2
CLEAR
145
150
148
152
ENABLE m-mode
3MHz
141
Start check counter
134
136
74193
CLOCK
CLEAR
138
9324
A>B
A<B
140
9324
A=B
142
COMPARATOR

CIRCUITRY FOR DISPLAYING A CONSTANTLY CHANGING M-MODE OUTPUT ON A RASTER SCAN DISPLAY

FIELD OF THE INVENTION

The present invention relates to storage display apparatus and more particularly to apparatus for displaying the output of an N-line storage random access memory.

BACKGROUND OF THE INVENTION

Many types of visual displays are known for fairly indicating to a viewer a constantly changing condition sensed by electronic sensing circuitry and processed by logic circuitry. The use of such display apparatus is particularly important in the medical arts where it is often essential for a physician to be given a clear, accurate and up to date indication of a particular condition.

Medical applications for electronic displays are continually broadening. The market for such displays is however limited by their significant costs. For example, in M-mode echo cardiography, in which an ultrasound transducer is employed for monitoring the motion of the heart, relatively complex and expensive storage oscilloscopes such as a Tektronix 607 and a Hewlitt-Packard 1321 have conventionally been used as display monitors.

The presently claimed invention seeks to provide display circuitry which enables an M-mode echo cardiography system to be manufactured at considerably less cost than is the case today and thus to be made available to a much wider range of users.

SUMMARY OF THE INVENTION

There is thus provided in accordance with the present invention, circuitry for displaying a constantly changing M-mode transducer scan output on a raster scan display in the form of a first multiplicity of data lines each containing a second multiplicity of data words and each representing a scan of the transducer output at a particular closely spaced scanning time and such that the data line representing the oldest scan is periodically erased and a data line representing the newest scan is displayed.

The circuitry comprises random access memory circuitry having a first multiplicity of memory elements each for storing a data line. A random access memory input counter enables loading of the random access memory, data line by data line, and a random access memory advance output counter enables read out from the random access memory sequentially one data word from each line for each raster scan.

Additionally in accordance with an embodiment of the invention buffer means and random access memory chip decoder means are provided for communication between the random access memory advance input and output counters and the random access memory.

BRIEF DESCRIPTION OF THE DRAWINGS

The invention will be more fully understood and appreciated from the following detailed description taken in conjunction with the drawing in which.

DETAILED DESCRIPTION OF THE INVENTION

Figure 1:
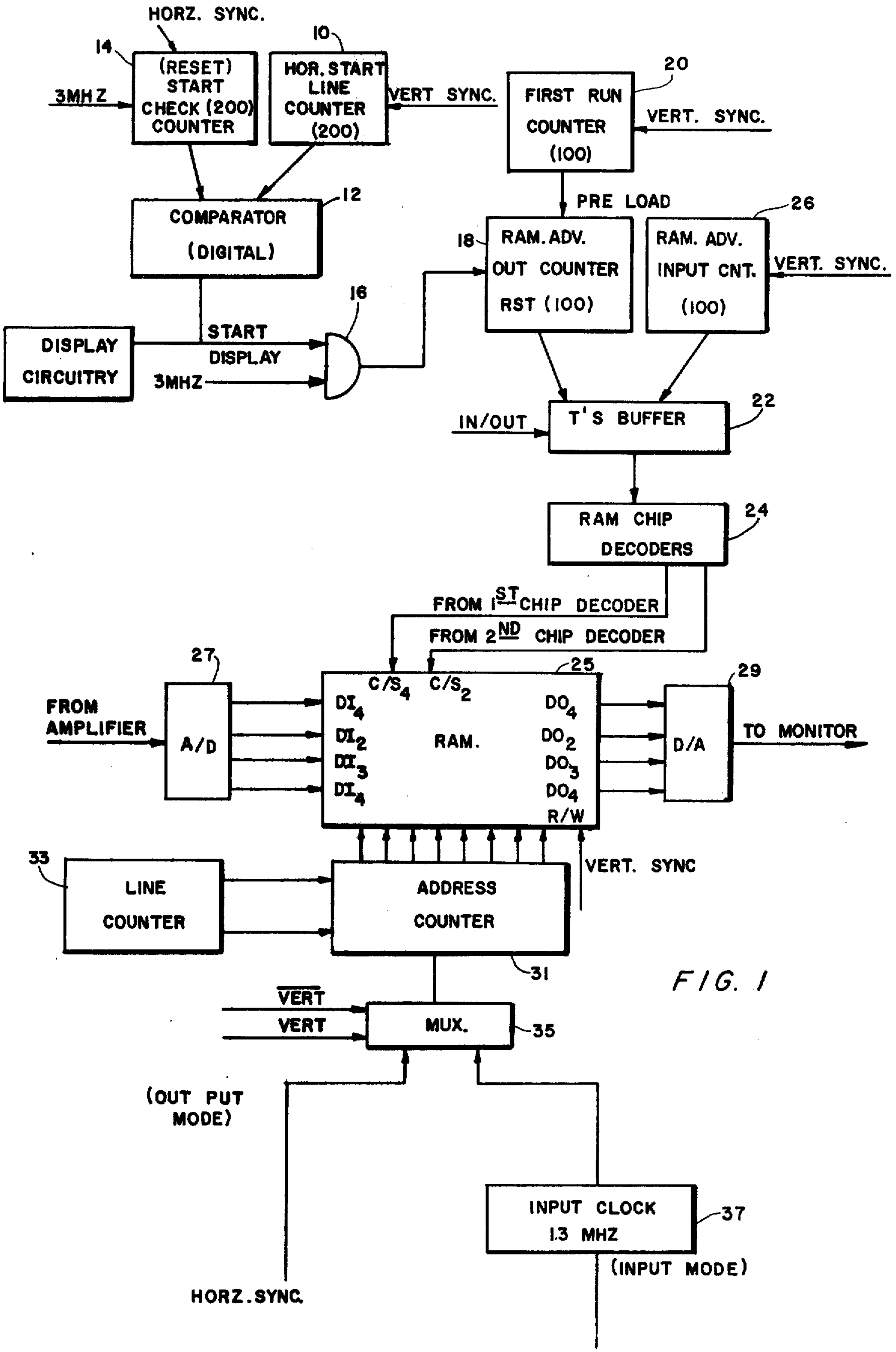
FIG. 1 is a schematic block diagram illustration of display circuitry constructed and operative in accordance with an embodiment of the invention.

Reference is now made to FIG. 1 which shows in schematic block diagram form, display control apparatus constructed and operative in accordance with an embodiment of the invention. A horizontal start line counter 10 which receives a vertical synchronization input from syncrhonization circuitry (not shown) and provides an output signal to a comparator 12. The output signal indicates which of typically 200 vertical line elements is the starting element for information display. The starting element is shifted by one unit each time the counter advances in response to a received vertical synchronization signal. Comparator 12 also receives an input signal from a start check counter 14. Start check counter 14 is reset with each horizontal synchronization input and advances at a 3 MHz rate. When its output is equal to that of horizontal line counter 10 comparator 12 provides an output signal to an AND gate 16 which also receives a 3 MHz clock input. The output of comparator 12 is also supplied to display circuitry such as a raster scan display in a conventional television receiver causing the cathode ray tube beam to be unblanked. The signal also is supplied to a random access mamory advance output counter.

Counter 18 receives a pre-loading from a first random access memory counter 20 which controls the address of the first line of information to be removed from the random access memory. First random access memory counter 20 receives a vertical synchronization signal causing it to shift by one unit with each vertical synchronization impulse. Random access memory output counter 18 provides an output signal to a buffer 22 which also functions as a multiplexer communicating with a pair of ram chip decoders 24 and in turn communicates with random access memory comprising typically 100 RAM chips 25.

A random access memory advance input counter 26 receives a vertical synchronization input and provides an output signal in response to the vertical synchronization signal which causes a line of data to be sequentially entered into the random access memory at a relative position determined by the count in the counter. This position is stepped by one with each vertical synchronization impulse received by the counter.

Associated with each RAM chip are an input A-D converter 27, an output D-A converter 29 and an address counter 31. The address counter receives inputs from a line counter 33 and from a multiplexer 35. Multiplexer 35 receives a vertical synchronization input and an inverse vertical synchronization input as well as a horizontal synchronization input and the input from a 13 MHz clock 37.

Figure 2A:
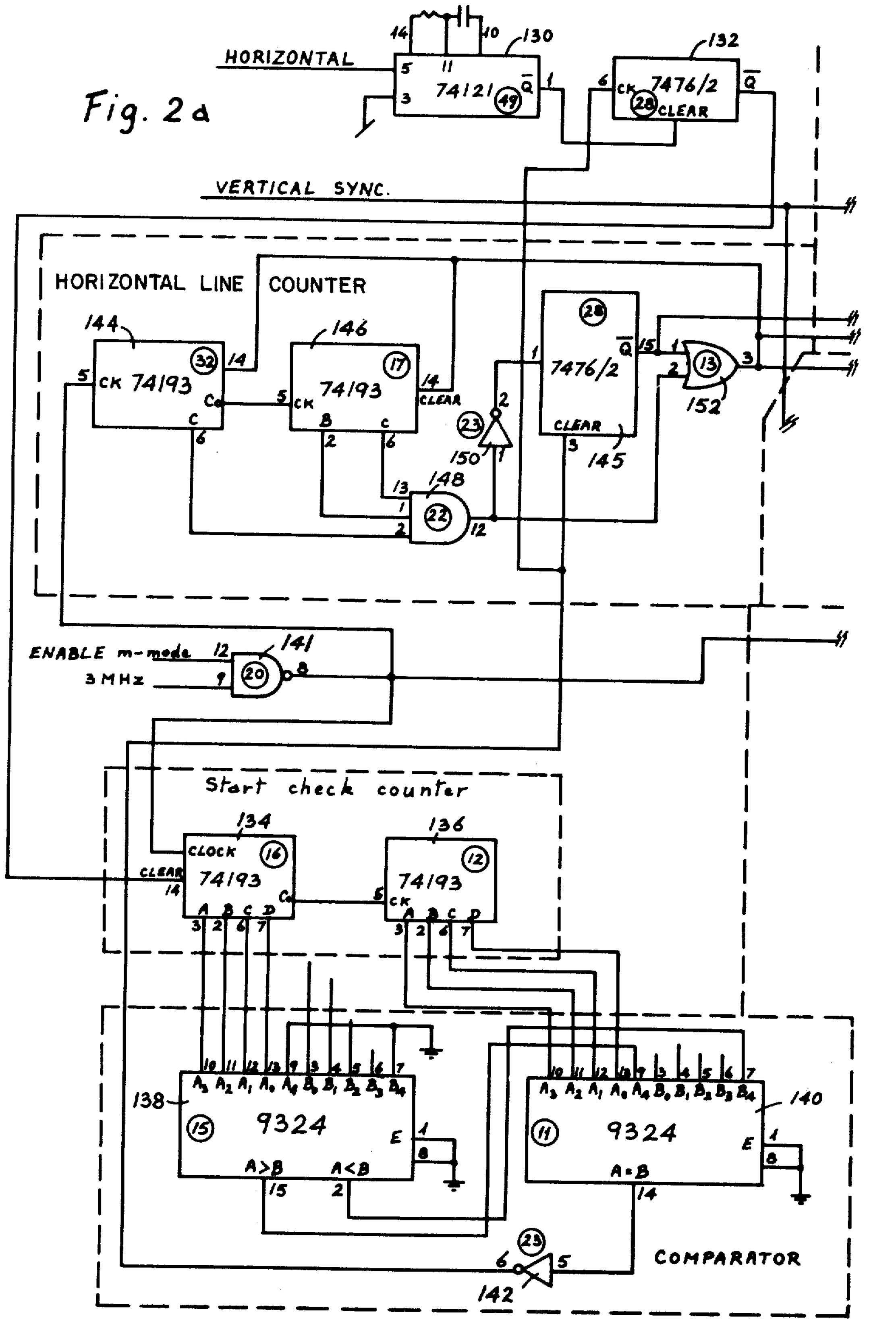
FIGS. 2A, 2B and 2C together form a detailed schematic illustration of one exemplary embodiment of display circuitry constructed and operative in accordance with an embodiment of the invention.
Figure 2B:
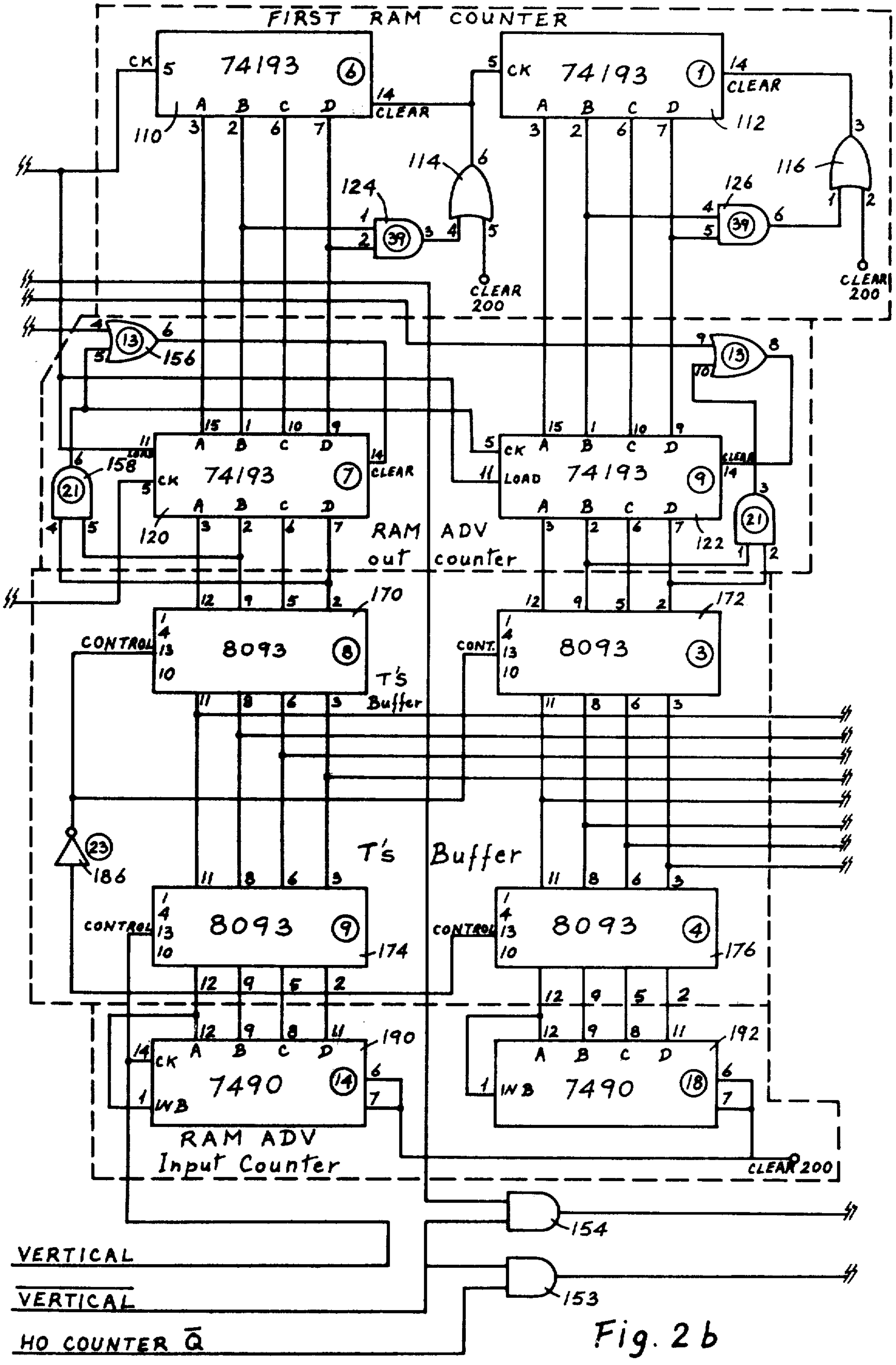
Figure 2C:
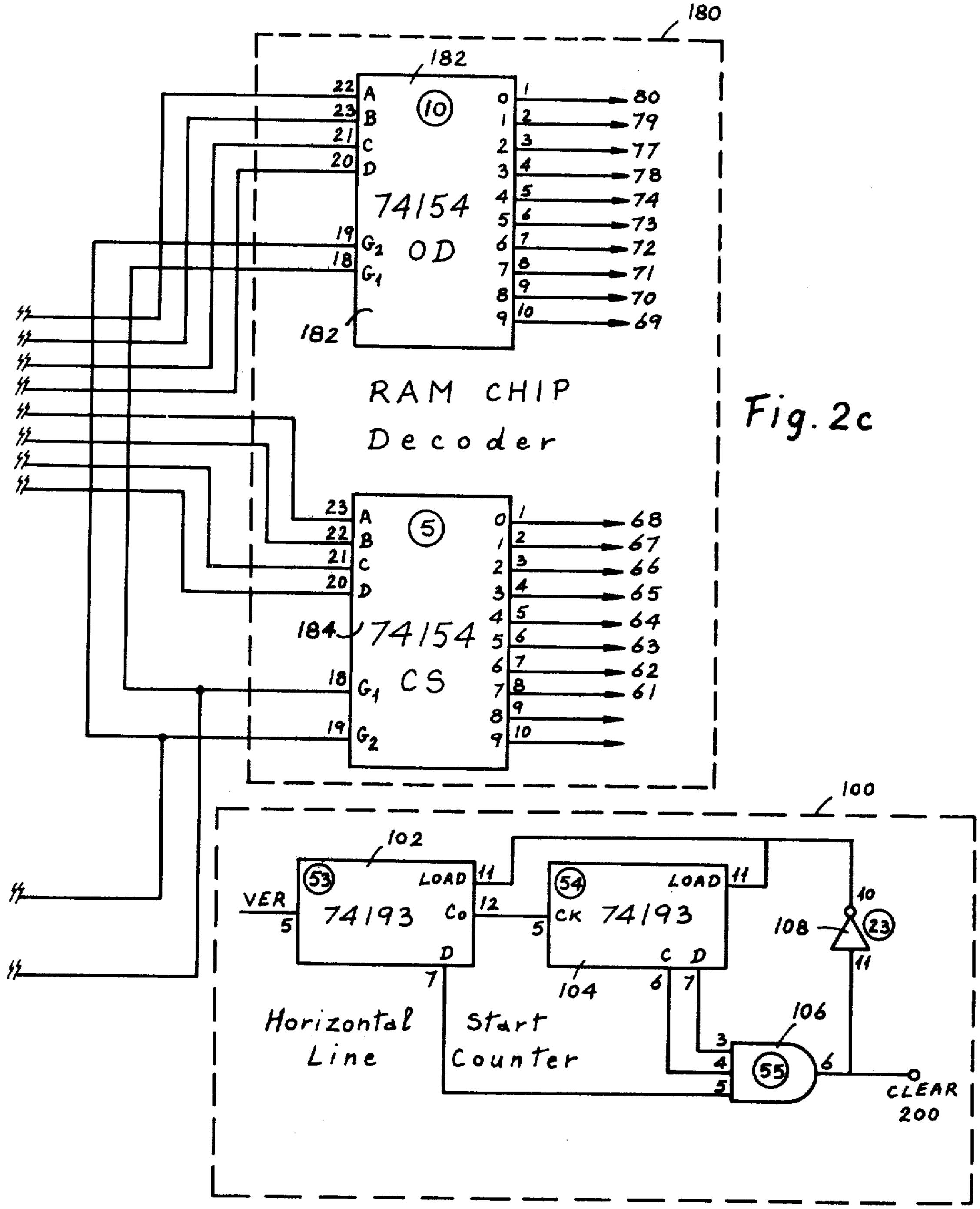

Referring now to FIGS. 2A–2C there is seen a detailed schematic illustration of display control circuitry for use with a conventional raster scan display and conventional random access memory apparatus. The various part numbers referred to hereinafter may refer to components manufactured by Texas Instruments, National Semiconductor or Intel and are common to all such components in the industry. A horizontal start line counter 100 comprises a 74193 integrated circuit chip 102 which receives a vertical synchronization input from synchronization circuitry (not shown). The Co output of chip 102 is supplied to the Ck input of a second 74193 integrated circuit chip 104. Terminal 7 of chip 102 and terminals 6 and 7 of chip 104 are provided to respective inputs of an AND gate 106 which provides an output signal identified as CLEAR. This signal is also fed back to the respective load inputs of chips 102 and 104 via an inverter 108. It may be appreciated that in accordance with an embodiment of the present invention a television output display is provided. The object of the circuitry described herein is to enable the display to generate information similar to the information display of a storage oscilloscope.

Here the storage consists of two hundred elements in each horizontal line and N horizontal lines are provided. The operation of the circuitry is governed by a number of counters such as the horizontal start line counter which indicates the starting element in the horizontal lines out of the two hundred elements therein in which the RAM holds information. The horizontal line consists of one hundred elements following this starting point. Thus the RAM storage is "shifted" to start at the selected point. Every vertical line synchronization signal passes the counter to advance such that the storage is shifted by one element. A start check counter cooperates with the horizontal start line counter and is reset with every horizontal synchronization impulse to start to advance at a 3 MHz rate. When the output of the start check counter equals that of the horizontal line counter the cathode ray tube beam is shifted to the start of the line where the RAM displays information. At the same time a start display signal enables operation of the RAM, causing data retrieval and transmission to the cathode ray tube.

A vertical synchronization signal is supplied to the Ck input of a 74193 chip 110 which together with another 74193 chip 112 forms a first RAM counter. The CLEAR inputs of respective chips 110 and 112 are received from respective OR gates 114 and 116 each of which receives the CLEAR output of AND gate 106. Terminals 3, 2, 6 and 7 of both chips 74193 are in turn connected to terminals 15, 1, 10 and 9 of respective 74193 chips 120 and 122 which together form a random access memory advance output counter. Outputs 2 and 7 of respective chips 110 and 112 are supplied at inputs to respective AND gates 124 and 126 whose respective outputs are supplied as the second inputs to respective OR gates 114 and 116. The output of OR gate 114 is additionally connected to the Ck input of chip 112.

A horizontal synchronization signal is supplied to terminal 5 of a 74121 chip 130 whose $\overline{Q}$ output is supplied to the CLEAR input of a 7476/2 chip 132. The $\overline{Q}$ output of chip 132 is in turn supplied to the CLEAR input of a 74193 chip 134 which together with a second 74193 chip 136 and two 9324 chips 138 and 140 comprises a start check counter and a comparator. Chip 134 also receives a clock input from the output of an AND gate 141 which receives a three MHz clock input as well as an enable ENM. The Co output of chip 134 is connected to the Ck input of chip 136. The 3, 2, 6 and 7 terminals of respective chips 134 and 136 are connected to respective terminals 10, 11, 12 and 13 of respective chips 138 and 140. Terminals 15 and 2 of chip 138 are in turn connected to terminals 9 and 7 of chip 140. Terminal 14 of chip 140 is applied via an inverter 142 to a clear input of a 7476/2 chip 145 and to the Ck input of chip 132.

The output of AND gate 141 is also supplied to the Ck input of chip 120 and to the Ck input of a 74193 chip 144, which, together with a second 74193 chip 146, defines a horizontal line counter. The Co terminal of chip 144 is connected to the Ck terminal of chip 146. Terminal 6 of chip 144 and terminals 2 and 6 of chip 146 are each supplied to inputs to an AND gate 148 whose output is in turn supplied via an inverter 150 to terminal 1 of chip 145. The output of AND gate 148 is also supplied at an input to an OR gate 152 which also receives an input from the $\overline{Q}$ output at terminal 15 of chip 145. The $\overline{Q}$ output from chip 145 is also supplied at an input to an AND gate 154. The output of OR gate 152 is supplied to terminal 14 of chip 144 and as the input to a second OR gate 156 which also receives an input from the output of an AND gate 158 which in turn receives inputs from respective terminals 2 and 7 of chip 120. The output of AND gate 158 is also supplied to the Ck input of chip 122.

The output of OR gate 156 is supplied at a CLEAR input to terminal 14 of chip 120. Terminals 3, 2, 6 and 7 of respective chips 120 and 122 are supplied to respective terminals 12, 9, 5 and 2 of respective 8093 chips 170 and 172 which together with identical chips 174 and 176 serve as a buffer and multipexer between the random access memory input and output counters and random access memory chip decoder 180 which comprises a 74154 OD chip 182 and a 74154 CS chip 184.

A pair of 7490 chips 190 and 192 which together define a random access memory input counter each receive at their respective terminals 6 and 7 the CLEAR input from AND gate 106. Chip 190 receives a vertical synchronization signal at its Ck input terminal 14. This vertical synchronization input is also supplied to terminal 13 of each of chips 174 and 176 and via an inverter 186 to the control inputs 13 of respective chips 170 and 172.

Terminals 12, 9, 8 and 11 of each of respective chips 190 and 192 are connected to respective terminals 12, 9, 5 and 2 of each of respective chips 174 and 176. Terminals 11, 8, 6 and 3 of respective chips 170 and 174 are connected as are respective terminals 11, 8, 6 and 3 of respective chips 172 and 176. Terminals 11, 8, 6 and 3 of chips 170 and 174 are connected to respective terminals 22, 23, 21 and 20 of chip 182. Terminals 3, 6, 8 and 11 of chips 172 and 176 are connected to terminals 20, 21, 22 and 23 of chip 184. Terminals 19 and 18 of respective chips 182 and 184 receive the outputs of respective AND gates 153 and 154. Both AND gates 153 and 154 receive an inverted vertical synchronization signal from AND gate 153 receives a $\overline{Q}$ signal from an HO counter (not shown). As noted above AND gate 154 also receives a signal from the $\overline{Q}$ output of chip 145. RAM decoder chips 182 and 184 in turn communicate with a random access memory. One output from each of ram decoder chips 182 and 184 is received by a RAM chip. Thus a total of one hundred RAM chips are coupled to decoder chips 182 and 184.

It will be appreciated that the invention is not limited to what has been expressly shown and described hereinabove but rather the invention is defined only by the claims which follow:

We claim:

1. Circuitry for displaying a constantly changing M-mode transducer scan output on a raster scan display associated with synchronization circuitry, said scan output being in the form of a first multiplicity of data lines each containing a second multiplicity of data words and each representing a scan of the transducer output at a particular closely spaced scanning time and such that the data line representing the oldest scan is periodically erased and a data line representing the newest scan is displayed, said circuitry comprising:

means for receiving data representing sequential scans of an M-mode ultrasound transducer output;

random access memory means, comprising a first multiplicity of memory elements, each for storing one of said first multiplicity of data lines representing a sample of the M-mode ultrasound transducer output;

horizontal start line counter means receiving a vertical synchronization signal from the synchronization circuitry and providing a first output indicating the relative horizontal position at which an information display sequence begins;

start check counter means receiving a horizontal synchronization signal and a clock signal from the synchronization circuitry for producing a second output indicating the horizontal position at which the raster beam of the display is currently located;

comparator means receiving said first and second outputs and providing a start display signal when said first and second outputs indicate the same horizontal position;

first random access counter memory means providing a third output;

random access memory advance output counter means receiving said start display signal from said comparator means and operative in response thereto to provide a fourth output representing instructions to said random access memory means, sequentially to read out, one data word from each data line during each raster scan beginning at a data word contained in a data line indicated by said third output; and random access memory input counter means receiving said vertical synchronization signal from said synchronization circuitry and providing a fifth output operative to load a data line representing the newest scan into said random access memory means at a memory element determined by said third output, such that upon receipt of every vertical synchronization signal a line of data is stored in sequential ones of said first multiplicity of memory elements.

2. Circuitry according to claim 1 and also comprising:

buffer means receiving said fourth and fifth outputs for multiplexing thereof and providing a sixth output; and random access memory decoder means receiving said sixth output and being operative for decoding said sixth output into address instructions and for supplying the address instructions to the random access memory means.

* * * * *